C. J. OVERMAN.
CAMERA.
APPLICATION FILED MAR. 31, 1915.
1,194,657.
Patented Aug. 15, 1916.
4 SHEETS—SHEET 1.
Fig. 1.
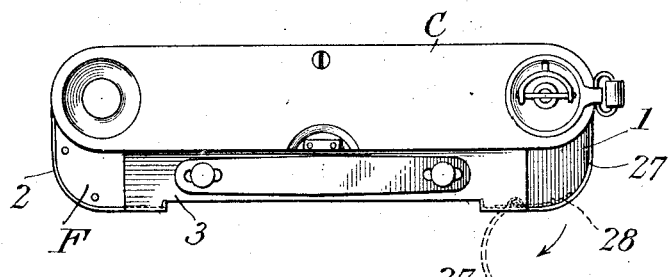
Fig. 2.
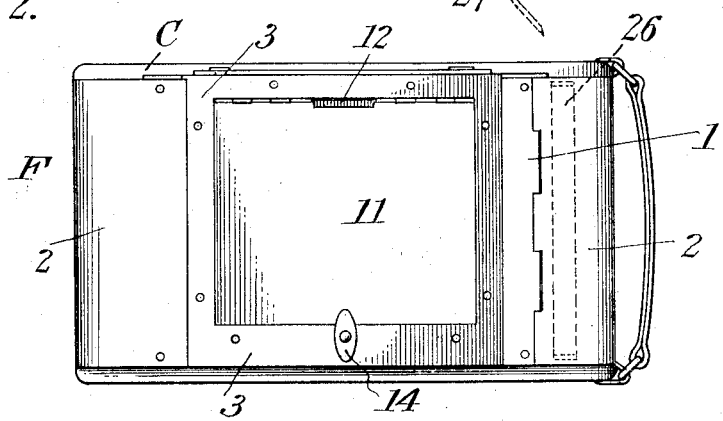
Fig. 7.      Fig. 8.      Fig. 9.
 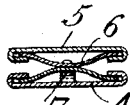 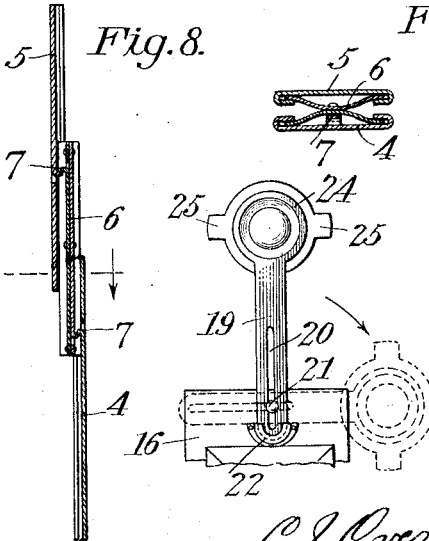
Fig. 10.
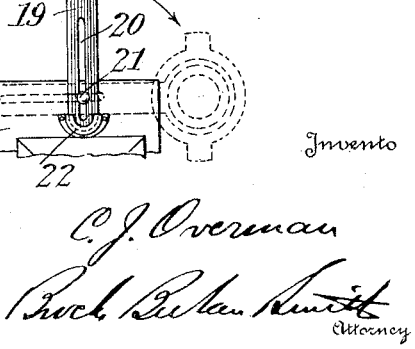

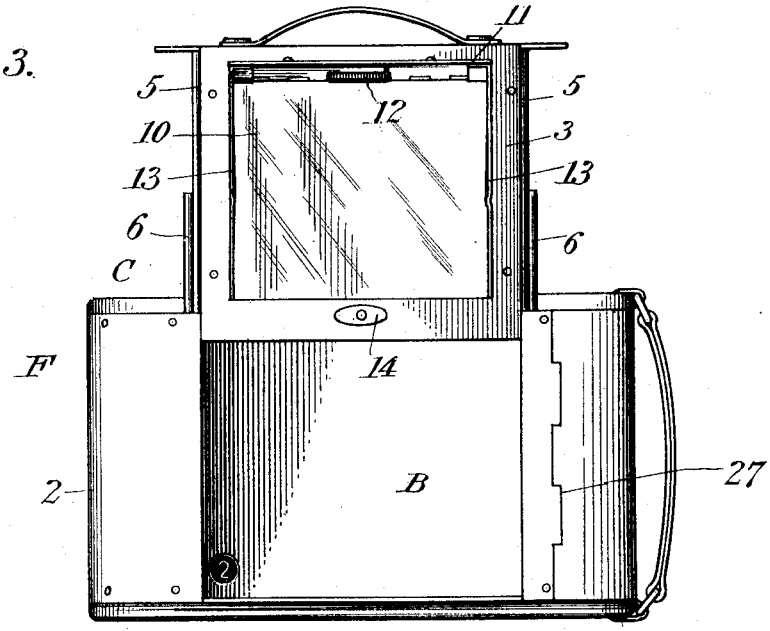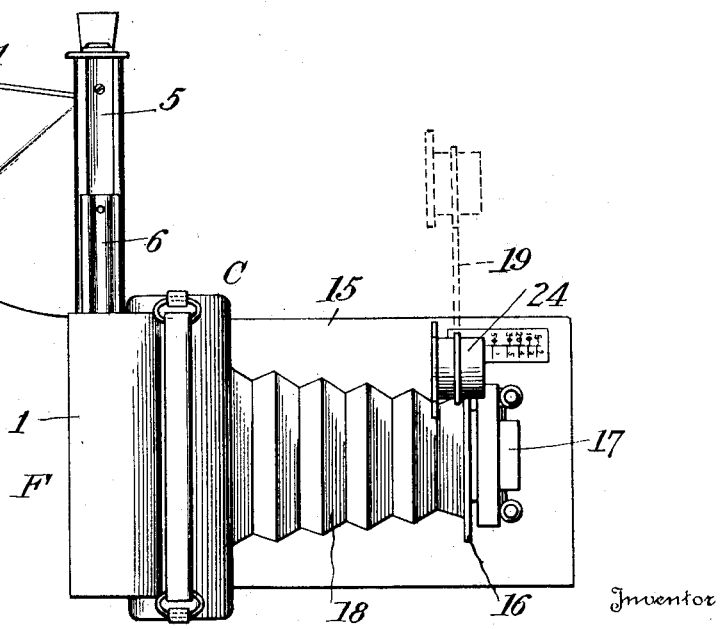

C. J. OVERMAN.
CAMERA.
APPLICATION FILED MAR. 31, 1915.

1,194,657.

Patented Aug. 15, 1916.
4 SHEETS—SHEET 3.

Witness
Fenton S. Belt

Inventor
C. J. Overman
By Buck, Baker & Smith
Attorney

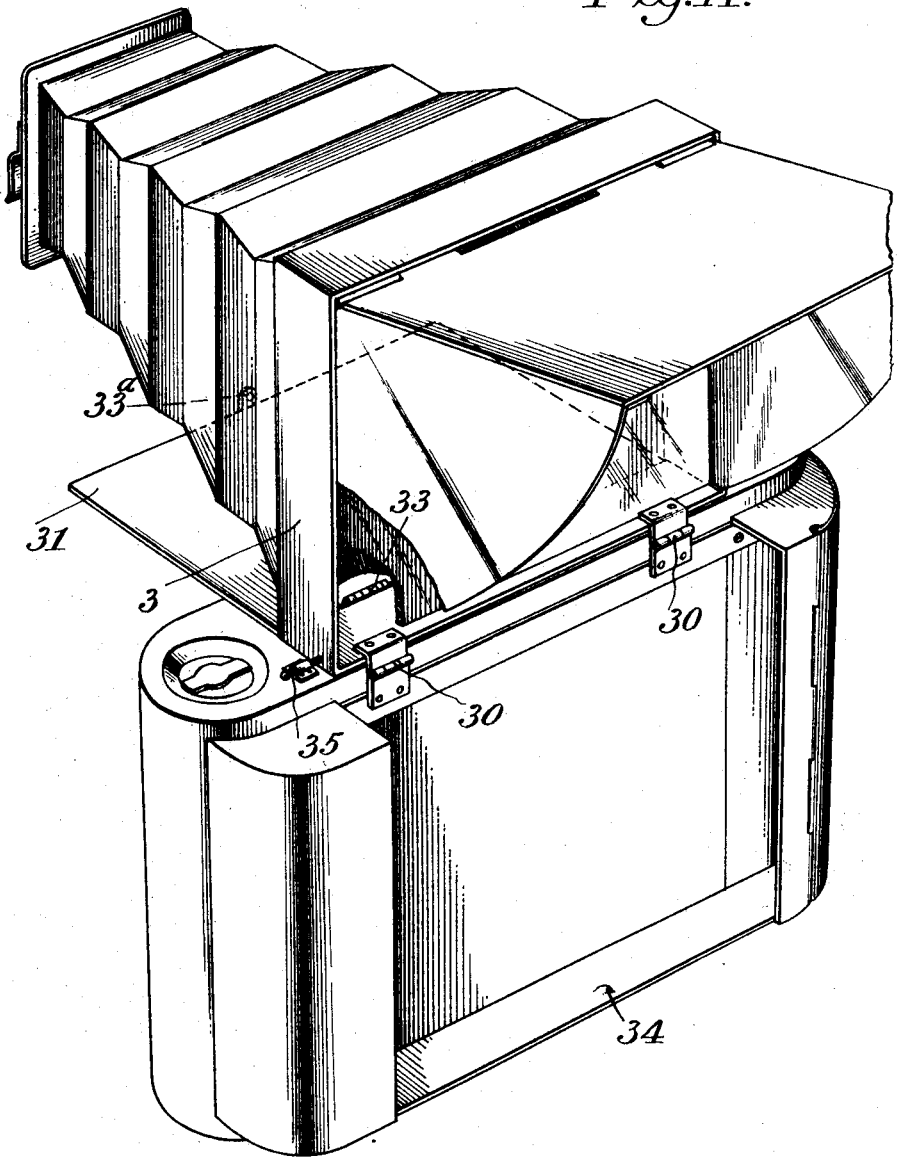

UNITED STATES PATENT OFFICE.

CHARLES JOSEPH OVERMAN, OF SAN ANTONIO, TEXAS.

CAMERA.

1,194,657.

Specification of Letters Patent.

Patented Aug. 15, 1916.

Application filed March 31, 1915. Serial No. 18,340.

*To all whom it may concern:*

Be it known that I, CHARLES J. OVERMAN, a citizen of the United States, residing at San Antonio, Texas, have invented certain new and useful Improvements in Cameras, of which the following is a specification.

The general object of my invention is to provide improved finding and focusing means for roll film cameras.

More particular objects are to provide means for accurately focusing the main or photographic lens without relying upon the scale; to provide means for determining the full extent of the view to be photographed; and to provide for seeing the image upon a ground glass up to the moment of exposure. In realizing these objects means are provided by which the user may have the picture or object of the exact size he wishes and in the position he wishes the same to be on the plate.

These objects have been obtained to greater or less extent in focal plane and other like cameras but the present invention enables the stated objects to be secured in a roll film or other like camera in which, ordinarily, finding is uncertain or difficult and the image cannot be observed upon a ground glass of any considerable size, and in which no accurate focusing can be made before exposure.

The advantages and characteristics of the invention will be further pointed out hereafter so far as is necessary in connection with a detailed description of the accompanying drawing, which shows exemplifying embodiments of the invention. After understanding these embodiments it will be apparent that the principles of the invention may be embodied in many different forms and I, therefore, do not limit myself to details except as claimed hereafter.

Figure 5:
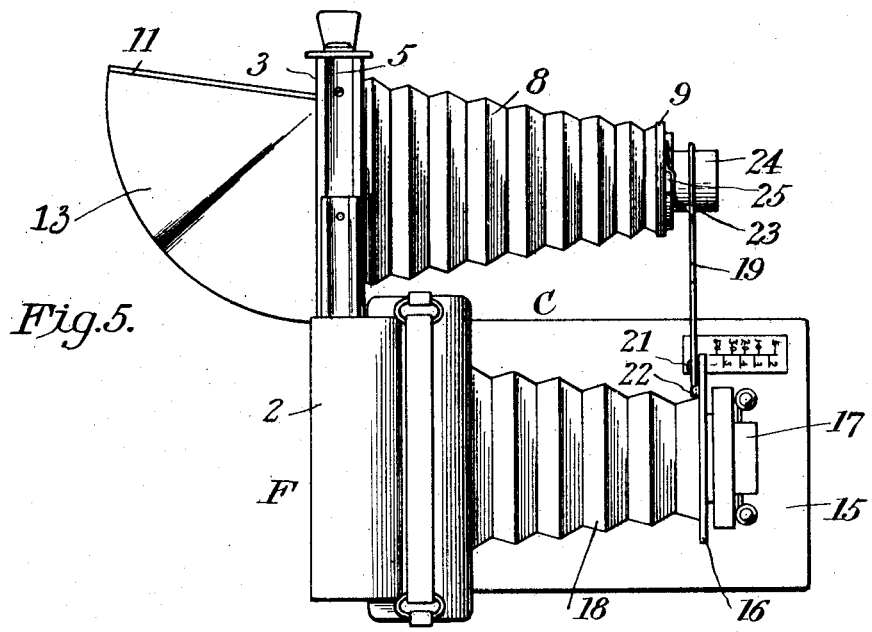
Figure 6:
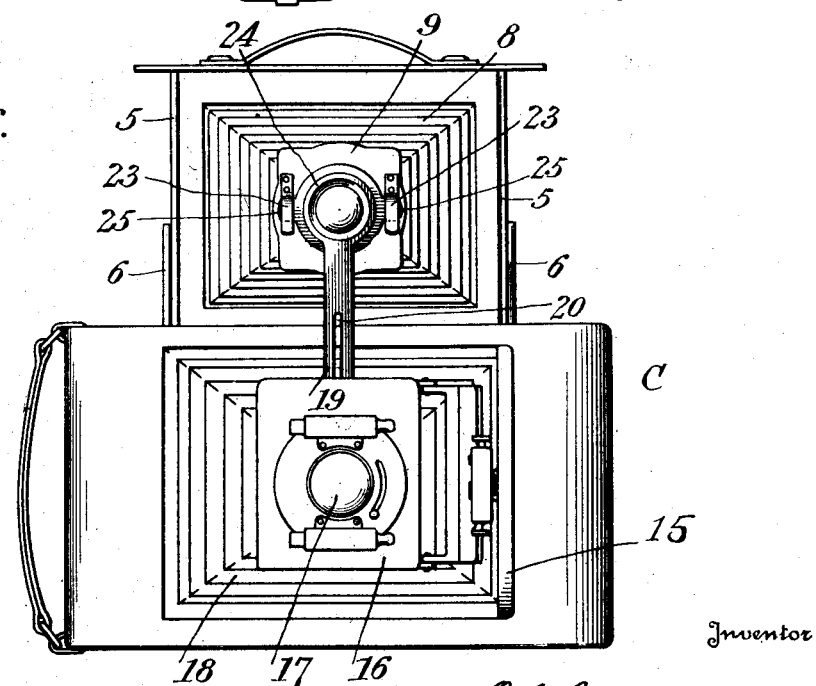

Figure 1 is a top plan of a camera embodying the invention, completely closed or folded. Fig. 2 is a rear elevation of the same in the same condition. Fig. 3 is a rear elevation with the finding or focusing means in operative position. Fig. 4 is a side elevation showing the camera proper extended for use and the focusing means partly extended or erected. Fig. 5 is a side elevation showing the entire apparatus in operative position. Fig. 6 is a front elevation showing parts in the same condition. Fig. 7 is a detail side view of the slide arrangement for the focusing attachment. Fig. 8 is a vertical section of the same. Fig. 9 is a horizontal section of the same. Fig. 10 is a detail of the focusing lens arrangement. Fig. 11 is a rear side perspective of a different embodiment of the invention, showing the focusing mechanism in partial operative position.

Referring first to the embodiment shown in Figs. 1 to 10 inclusive, C designates as an entirety a foldable roll film camera of ordinary form, to which is added a housing or inclosure F for a part of the finding and focusing mechanism.

For the sake of brevity hereafter the finding and focusing devices will be referred to simply as focusing devices, in view of the fact that usually they may also serve as a finder.

The invention is such that the focusing parts may be embodied in the original design and manufacture of the camera or they may be added as an attachment, and this addition may be made easily and with few changes in the structure of the camera proper. For example, cameras of this class ordinarily have a removable rear cover or backboard B, and the housing F in the present embodiment may be secured to this cover in any suitable way.

The housing comprises two parts 1 and 2, providing slideways in which a slidable frame 3 is mounted. To provide for elevating the frame sufficiently when in operative position, a compound slide will frequently be desirable, as shown in detail in Figs. 7 to 9. At each side of the frame 3 the adjacent housing portion carries a fixed guide 4 and the frame also carries a guide 5. In these guides, and fitting channels formed therein, is a slide 6 conveniently made, in one embodiment, of two pieces of spring-metal properly secured together. This slide and the guideways are provided with coöperating stops 7 to limit the movement of the respective parts, as clearly shown in Fig. 8. By means of this arrangement the frame 3 may be completely and compactly telescoped in its housing, as shown in Fig. 2, or it may be elevated completely above the body of the camera as shown in Fig. 3, and is quite firmly supported in that position by reason of the slides 6 engaging for a considerable distance with the guideways, both of the frame and the housing.

Frame 3 is provided with a bellows 8 carrying a front piece or lens-board 9. The frame also carries a ground glass 10 upon which the focused image is to be thrown and this is protected by a hinged cover 11 which may be provided with a spring 12 and foldable side flaps 13 to shade the ground glass for focusing. A turn button 14 may be used to secure cover 11 in closed position and when released the spring elevates the cover to operative position, as in Figs. 4 and 5.

The camera proper has a hinged front 15 with usual guideways for front-piece or lens-board 16 carrying the main or photographic lens 17, and the usual bellows 18, etc. Parts of the camera proper are identified as "main" or "photographic" parts; for instance, main or photographic lens, main bellows, etc., to distinguish them from similar parts of the focusing means.

To properly locate and support the front end of the focusing bellows and for other purposes, it is usually preferable to secure the front end to the front end of the main bellows, and in this embodiment this is done by means of a slidable and swinging arm 19, which may be identified as the connecting arm or focusing-lens-arm. This arm has a slot 20 slidable upon a pin 21 carried at the back of the main lens-board 16. Fig. 10 is a view from the rear of this lens-board, showing the adaptation to it of arm 19 and also showing adjacent to the pin 21 a socket 22. The front or lens-board 9 of the focusing bellows is provided with clips 23 and arm 19 carries a lens-tube 24 provided with lugs or ears 25 to coöperate with the clips. When frame 3 is raised and the focusing bellows 8 extended, arm 19 is pulled out and swung up from its idle or folded position, shown in dotted lines in Fig. 10. Its lower end is placed in socket 22 and ears 25 of the lens-tube are slipped into clips 23. Thus the main camera parts and the focusing parts are firmly and properly supported in relation to each other in operative position. The camera front-board 16 is moved forward and back as the focused image is observed upon the focusing ground glass and at the same time, of course, the focusing lens is moved, and the two lenses having the same or properly related qualities an accurate focusing of the main lens is thus effected. At the same time, through the focusing lens the image may be observed in a size exactly related to the size of the image that may be made upon the film by the main lens and the size of the view may thus be determined accurately without the confusion which arises in the case of certain finders, these difficulties being well understood by persons who have used them.

From the foregoing it will be evident that in one sense the arm 19 and related parts or equivalent means serves as a support for the focusing device; in another sense it serves as a connector between the focusing bellows front and the movable front of the main bellows. In a preferred embodiment, focusing front-board 9 may carry a part of the focusing lens combination, while the lens-tube 24 may carry the remaining parts of the lens combination. The purpose of this arrangement is to make the lens-tube 24 sufficiently compact to be foldable within the main camera body. Considering the arm 19 and adjacent parts simply as supporting and connecting device, however, the entire focusing lens could be removably attached to the arm or to the focusing front-board 9 and could be transported separately.

In cases where an autographic device for placing written descriptions upon a film is embodied in the main camera, such device being indicated in dotted lines at 26 (Fig. 2), a swinging cover 27 is provided to give access to such device. This cover may be provided with a spring or catch 28 to keep it normally closed.

Fig. 11 shows in perspective a different embodiment in which the frame 3 is hinged to the camera body at 30. The focusing parts are set up for use by swinging instead of by sliding, as previously described. Otherwise, the parts and their operation are similar to the foregoing except that frame 3 is in this case provided with an outer cover 31 hinged at 33. This cover when focusing parts are in operative position, as in Fig. 11, lies horizontally under the focusing bellows. When folded, cover 31 closes the outer face of frame 3 and is secured, and in turn secures the frame by means of a catch 33ª or other suitable fastening engaging with the frame of the housing at 34. When in operative position, the frame 3 may be secured by a bolt 35.

It will be understood that not only may the main camera be accurately focused but the object may be observed through the focusing lens upon the ground glass up to the moment of exposure and during exposure. These results are here secured for a camera of a different type from the focal plane cameras and by different means.

If it is desirable or necessary, frame 5 and slide 6 may be maintained in elevated position by providing intermediate the spring-pressed parts 6 of the slide and its slideways suitable sockets and projections or balls to engage the sockets and thus yieldably or securely hold the frame in elevated position. Details of such a spring or ball and socket fastening will be readily understood without further explanation.

I claim:—

1. The combination with the box, lens and bellows of a folding camera, of a housing carried by the box, a focusing bellows foldable within the housing, and means for extending the focusing bellows and connecting it with the movable front of the camera for focusing.

2. The combination with the box, lens and bellows of a folding camera, of a housing at the rear of the box, a focusing ground glass and bellows folded within the housing, and means for connecting the front end of the focusing bellows to the camera lens so that the main and focusing bellows will move together in focusing.

3. The combination with the box, lens and bellows of a folding camera, of a housing at the rear of the box, a focusing ground glass arranged to fold within the housing and to extend above the box substantially in line with the camera back when extended, a focusing bellows secured to the ground glass and adapted to fold within the housing, a focusing lens and means to connect the focusing lens to the camera lens and to the front of the focusing bellows.

4. The combination with the box, lens and bellows of a folding camera, of a housing at the rear of the box, a focusing ground glass arranged to fold within the housing and to extend above the box substantially in line with the camera back when extended, a focusing bellows secured to the ground glass and adapted to fold within the housing, a focusing lens movably secured to the camera lens and means for detachably connecting the front of the focusing bellows with the focusing lens.

5. The combination with the box, lens and bellows of a folding camera, of a housing at the rear of the box, a focusing ground glass arranged to fold within the housing and to extend above the box substantially in line with the camera back when extended, a focusing bellows secured to the ground glass and adapted to fold within the housing, a focusing lens, an arm carrying the focusing lens and pivotally and slidably connected to the camera lens and a quickly releasable device to connect the front of the focusing bellows with the focusing lens.

6. The combination with the box, lens and bellows of a folding camera, of a housing at the back of the box, a frame mounted to slide within the housing when closed and when extended to extend beyond the box at one side thereof, a focusing ground glass in the frame, a focusing bellows secured to the frame and adapted to be contained within the housing when folded, a focusing lens movably connected to the foldable camera front and a releasable connection between the focusing lens and the focusing bellows.

7. The combination of a folding camera comprising a normally closed back, a bellows, a front piece thereon and a main lens carried by the front piece, an extensible focusing frame, a ground glass and foldable bellows therein, a front piece on said focusing bellows, a movable connector carried by the main front piece to connect the same with the focusing front piece and a lens carrier carried by said connector to coöperate with the focusing front piece, bellows and ground glass in focusing and foldable within the main camera inclosure.

CHARLES JOSEPH OVERMAN.

Copies of this patent may be obtained for five cents each, by addressing the "Commissioner of Patents Washington, D. C."